United States Patent [19]

Schumacher

[11] Patent Number: 4,500,259

[45] Date of Patent: Feb. 19, 1985

[54] FLUID FLOW ENERGY CONVERTER

[76] Inventor: Berthold W. Schumacher, 24635 Winona, Dearborn, Mich. 48124

[21] Appl. No.: 293,857

[22] Filed: Aug. 18, 1981

[51] Int. Cl.³ .............................................. F03D 3/02
[52] U.S. Cl. .................................... 416/122; 416/176
[58] Field of Search .............. 416/122 A, 176 A, 122, 416/176 R, 177; 415/61, 71

[56] References Cited

U.S. PATENT DOCUMENTS

| 44,230 | 9/1864 | Spaulding | 416/176 A |
|---|---|---|---|
| 953,891 | 4/1910 | Atkins | 416/176 A |
| 1,025,929 | 5/1912 | Snook | 416/176 A X |
| 1,349,077 | 8/1920 | McChesney | 416/176 A |
| 1,461,502 | 7/1923 | Solinger et al. | 416/176 A X |
| 1,729,362 | 9/1929 | Ruthven | 416/13 |
| 1,745,356 | 2/1930 | Crofton | 416/86 |
| 1,767,995 | 6/1930 | McChesney | 416/176 A |
| 3,818,704 | 6/1974 | Lapeyre | 416/176 A |

FOREIGN PATENT DOCUMENTS

| 453231 | 12/1927 | Fed. Rep. of Germany | 416/176 A |
|---|---|---|---|
| 512909 | 11/1930 | Fed. Rep. of Germany | 416/176 A |
| 2811126 | 9/1976 | Fed. Rep. of Germany | 416/121 A |
| 2913290 | 10/1980 | Fed. Rep. of Germany | 416/176 A |

Primary Examiner—Everette A. Powell, Jr.

[57] ABSTRACT

Energy is extracted from a free-stream fluid flow of wind or water by means of a multi-turn helicoid structure with a relatively small pitch angle. The axis of the structure about which the helicoid turns is making an angle with the flow vector in the order of or slightly larger that the pitch angle. Several such helicoid structures are combined with their radii overlapping, for the most effective interception of a certain cross sectional area of the fluid flow. Mile-long helicoid walls may be erected in this fashion. Using groups of helicoids which alternately turn clockwise and counter-clockwise all gyroscopic forces, which appear when the structures are turned to follow changes in the direction of the flow, are internally balanced. An omni-directional structure is also described which need not be turned when the flow direction changes. It is obtained by adding flow-diverters surrounding a helicoid structure with vertical axis. It is shown how various types of light and thin but rigid helicoid surfaces can be constructed from sheet materials without requiring plastic deformation because of the small pitch angles, as here employed.

11 Claims, 25 Drawing Figures

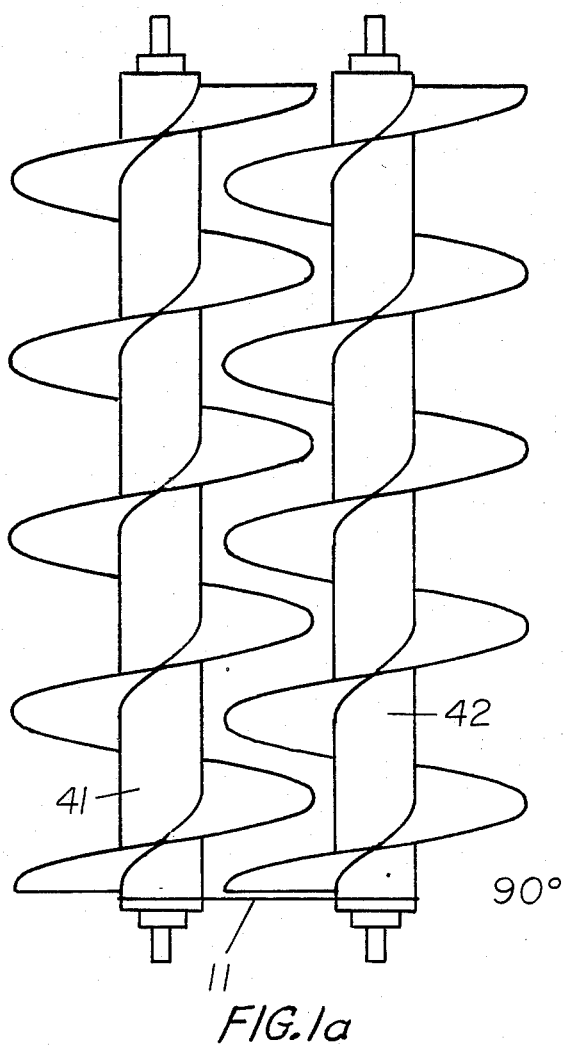
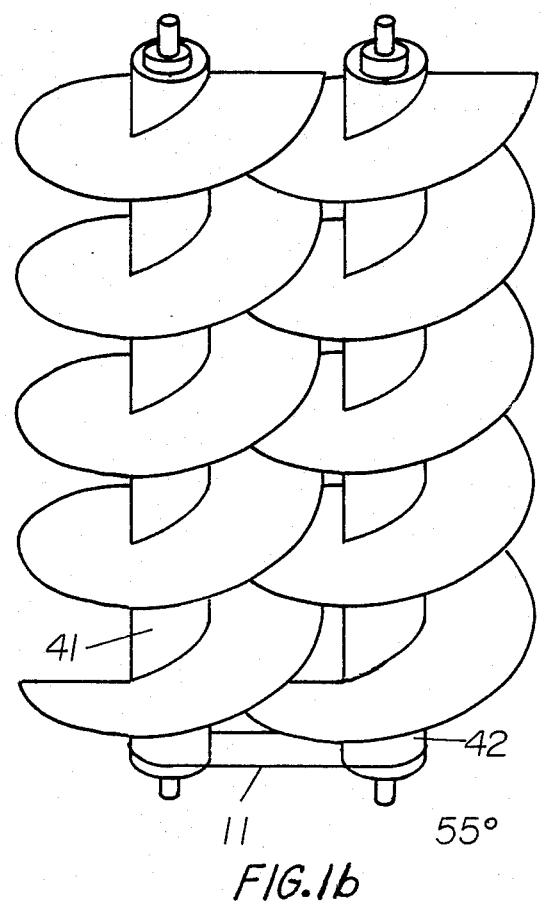
FIG.1a
FIG.1b

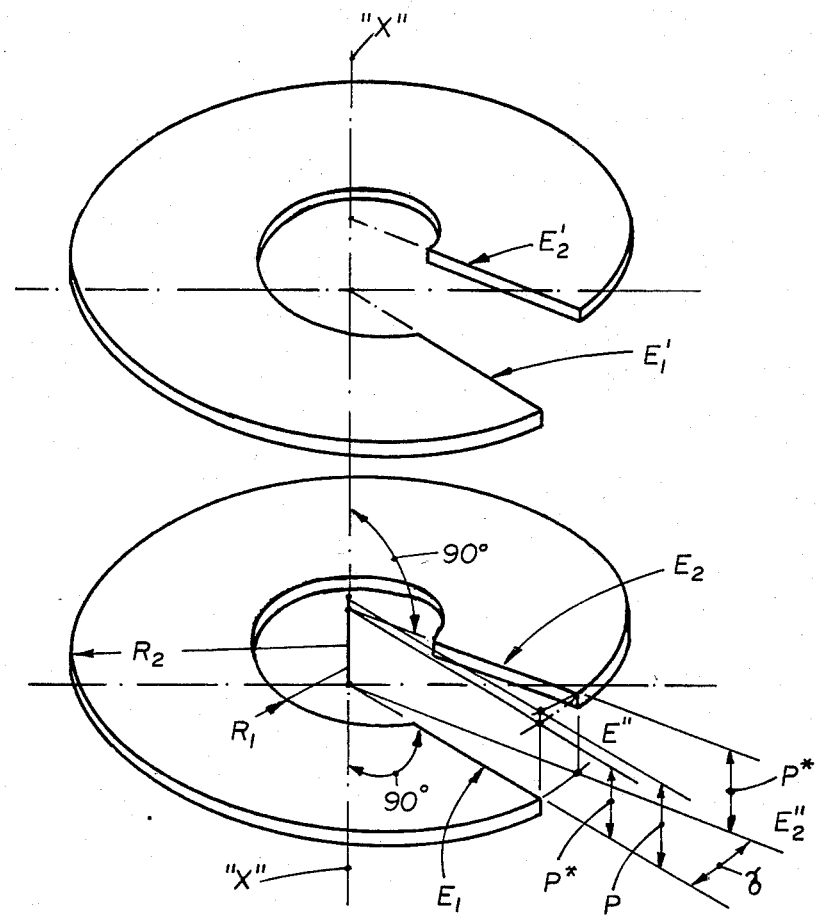
FIG.6
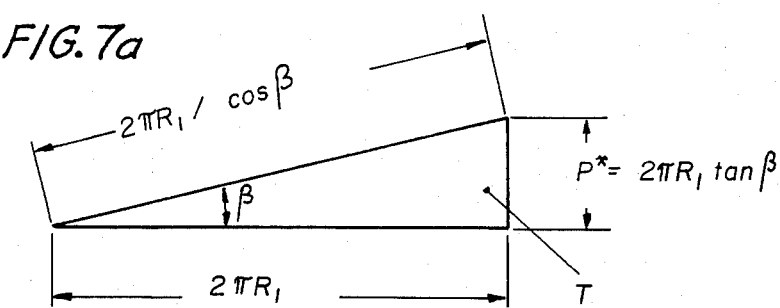
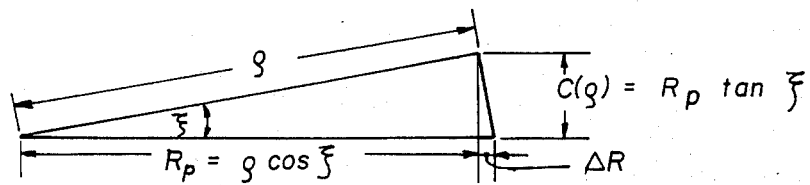

FLUID FLOW ENERGY CONVERTER

BACKGROUND OF THE INVENTION

1. Field of the Invention

The present invention relates to free-stream wind and water mills, more particularly to multi-turn helicoid structures set in rotary motion by the wind or by free-flowing water, thereby extracting kinetic energy from the flow.

2. Description of the Prior Art

The construction and use of wind and water mills dates back to pre-history. Nevertheless, renewed interest has arisen even to the extent that recent surveys of wind mill technology have been funded by U.S. Government Agencies. A review of the traditional as well as the newer technology has been prepared in a report by the Mitre Corporation, written by Frank A. Eldridge, under Grant No. AER-75-12937 of the National Science Foundation, dated October 1975, entitled "Wind Machines" (Superintendant of Documents, U.S. Printing Office, Stock No. 038-000-00272-4; re-issued as book with the same title by Van Nostrand Reinhold Co. New York, 2nd Edition 1980). This report also contains a glossary of terms to which I will adhere in the following.

Water mills, on the other hand, have had a continuous evolutionary development within the progress of modern technology, which led ultimately to the various turbine designs of our present hydro-electric power stations.

My invention is best described and understood with reference to wind mills. Just as all wind mills do, the device I have invented "extracts" or "converts" some of the kinetic energy of the moving fluid into mechanical or heat energy or electrical energy for useful purposes.

Wind mills are broadly classified into two types: drag types and lift types. The lift types are using blades which look much like aircraft wings or propellers. (Propellers are sometimes called "air screws" or "helical blades", particularly in the British literature; but these have nothing in common with the structure of my present invention.) These lift type blades require intricate aerodynamic design, must run at high speed to be efficient and must be very large, because a single one of them does not intercept a large cross sectional area of the wind flow. Large speed and large size are requirements which are difficult to reconcile.

The drag type of wind mills, such as the Savonius-Rotor, are simple in construction but they depend on a difference in drag exerted by the wind on each of the rotor wings or "shovels", this difference being caused solely by the different geometrical shapes presented to the wind, namely, a convex surface in one view, a concave "bucket" in the other view. Such rotors are therefore inherently inefficient and they experience forces that are not utilized to generate rotational momentum, yet these extra forces must also be sustained by the structures. The above factors impose severe limits on the size of the designs, on the drag type as well as on the lift type of devices.

Propeller type designs are also limited by gyroscopic forces which appear when their axis changes its orientation.

It is the objective of my invention to build a wind energy converter, and, more broadly, an energy converter for the kinetic energy of any free-stream fluid flow, that is of simple shape, that presents essentially no spurious surface area to the flow which could produce a counter-momentum to the desired rotational momentum, and that permits to intercept with its working-surface a large cross sectional area of the flow. It is a further objective to control and balance gyroscopic forces within the system itself, so that no such forces interfere with the free and easy adjustment of the total system to the flow vector or to changes in the flows direction.

Surprising as this may seem, the structure which can accomplish these feats is a helicoid, no other than a large Archimedian screw or Archimedian spiral. To be precise, there is a difference between a spiral, a screw, a helix, and a helicoid. The latter is defined in the Random House dictionary as follows: "A warped surface generated by a straight line moving so as to cut or touch a fixed helix." A helix is, of course, a line on a cylinder progressing with each full revolution a certain distance called the pitch towards the right or the left (assuming the cylinder lies horizontal).

To utilize helicoids as fluid flow extractors, it is only necessary to incline them slightly to the direction of the flow, the angle of inclination being in the order of the mean pitch angle of the helicoid or slightly larger. A duct is not necessary. The prior use of the Archimedian screw was generally that of a driven device, e.g. for raising water. In modern screw compressors and pumps it is used in essentially the same way. In each of these cases it is enclosed in a duct, and the fluid is transported parallel to its axis. No wind mill of the helicoid type is found among the various types discussed by Eldridge (quoted above).

There is one wind mill type used in the Phillipines which uses cloth sails on a wooden frame, the sail sections forming a single turn of a screw (instead of being broken-up into separate blades and mounted in one plane, as usual). It is therefore also called "helical sail wind mill" or "cyclo wind mill". Its axis is pointed into the wind, therefore more than one circle of sails would be useless. It is a large, slow-speed device, designed for pumping water. (A description can be found in the VITA-Publication "Helical Sail Windmill", ISBN 0-86619-036-8, 1980).

There is yet another type of wind mill which uses two twisted surfaces that form two, unconnected, helical rotors at some distance from a thin central shaft. It resembles a Savonious Rotor which is split and twisted. In some models the central shaft may even be missing, while sails of cloth are streched out by ropes their spacing being secured by short sticks of wood or metal; these are known as tetra-helix sails. In all cases, the pitch of these helical surfaces is rather steep, with a pitch angle near 80 degrees, and they make just one turn over the full length of the structure, which length is many times greater than the diameter and spacing of the surfaces. This type of helical double rotor, as well as the tetra-helix sails, are described, yet only scantilly, in the book by Dermot McGuigan entitled "Harnessing the Wind for Home Energy", Garden Way Publishing, Charlott, Vt. 05445.

In the just mentioned designs there is no central cylindrical body which holds the helical surfaces, as in my present invention, and the two helical sails do not form one continuous surface, as do the helical sheets in my present invention. These designs lack completely the strength and stability of the helicoid structure of the present invention. It is even mentioned as an advantage that the cloth sails will collapse in case of excessive winds. My present invention is designed to withstand the strongest of winds.

With respect to the commercial importance of any improved wind mill design, it can be pointed out that wind blows everywhere, whereas wave or tidal power are only awailable at certain coast lines. It has therefore been estimated that in due course wind power may generate over $10^{13}$ kWh/year, whereas wave and tidal power may perhaps achieve 1/10th of this level in the United States. (See the book by Donald E. Carr: "Energy and the Earth Machine", Norton, N.Y., 1976 Chapter 9, pp. 115–123).

SUMMARY OF THE INVENTION

The new wind and water mill according to this invention consists in its basic form of a multi-turn helicoid made from thin sheet material, such as sheet metal, plywood, plastic sheet, which is in itself stiff, said helicoid sheet being supported by a round central cylinder. FIGS. 1 and 2 shall be introduced at this point, because they show a typical structure of this type, and which is hard to describe without reference to a picture. The outer diameter of the helicoid sheet is approximately 3 to 12 times greater than the diameter of the central cylinder. This helicoid sheet can have any number of turns. The pitch distance from turn to turn is less than its outer diameter and in the order of the diameter of the central cylinder. Its mean pitch angle, namely the angle between the normal to the helicoid surface and a parallel to the central axis, is therefore relatively small, namely in the order of 6 to 36 degree. While the pitch distance is the same for all points of the helicoid surface, the pitch angle is a function of radius, as will be discussed more fully later; we therefore refer to a mean pitch angle.

The most essential feature of the system is that the axis of the helicoid structure is inclined with respect to the direction of the flow, making an angle with it of the same order or slightly larger than the mean pitch angle of the helicoid. The helicoid axis may be vertical or horizontal; only the relative orientation with respect to the flow vector is of any importance.

In a horizontal flow, with the helicoid axis nearly vertical, it does not matter either, whether the upper end of the helicoid is tilted toward the flow or in the direction of the flow; however, the helicoid will rotate in different directions in one case and in the other. In neither of these cases are flow directing means required; the helicoids are essentially free-flow energy extractors.

If the fluid flow were not horizontal, but the flow vector would point upward by, say 25 degree, either naturally or so directed by auxiliary flow directing means, then the helicoid axis can be kept exactly vertical; with properly arranged flow directing means the device can then even be omni-directional, as will be explained in detail later.

At this point it may be helpful and appropriate to clarify and determine the usage of terminology. The helicoid sheet has two sides, as has even the thinnest sheet of paper. We will refer to these two sides as helicoid surfaces in the geometric sense, but when speaking of the structure use the term helicoid sheet. The short terms "helicoid" and "helicoid axis" will be used in the geometric as well as in the structural sense when a closer distinction seems not required.

An inclination of the helicoid axis with respect to the flow direction causes a change in the projected area of the two halves of the helicoid's surfaces exposed to the flow, namely, the half on the right and the half on the left of the (nearly vertical) axis. One of the projected or visible surfaces of the helicoid sheet may also be the upper, the other the lower one, depending on the viewing angle. FIG. 2 shows this effect clearly. The flow will therefore exert a one-sided pressure which produces a momentum about the axis of the helicoid and puts it in rotation. The helicoid axis is held in an appropriate frame with proper bearings, and its rotation is transmitted by appropriate means to an electrical generator or the like, which uses or converts the rotational energy which is transmitted.

Several helicoids can be arranged side by side. Moreover, they can be arranged side by side with their radii overlapping, so as to intersect any cross sectional area of the flow nearly completely.

An array of helicoids equipped with proper floats can be anchored to the ocean bottom with a cable to keep it deep underneath the surface, protected from wind and wave effects.

In a similar manner, an array of helicoids can be floated in the atmosphere with the aid of balloons, or suspended in the air from cables held by high towers or strung between mountain tops.

It must be appreciated that the helicoid sheet structure is, because of its curvature and because of its aforementioned attachment to the central cylinder, a very stable and stiff structure, even if made of very thin material. The central cylinder can be light and tubular in nature. Such structures can therefore be built light in weight as well as low in cost. Being symmetrical rotating devices, they can be readily balanced and therefore turn at high speed.

The above mentioned "generating line" for the helicoid surface can be perpendicular to the axis, or it can form an angle of, say, 80 degree with the axis. In the latter case any part of the helicoid sheet then resembles a funnel, seen from one side, or a cone, if viewed from the other side. This increases the stiffness of the structure; it also deflects the flow somewhat differently. The funnel shaped structure is actually somewhat easier to manufacture than the strictly radial type, as will be discussed later.

A helicoid sheet with a generating line at, say, 85 degree to the axis, and a second one with a generating line at, say, 75 degree to the axis, can be attached to the same central cylinder at a small distance from one another, a distance less than the pitch distance. At their outer diameter they will meet and follow the same spiral line, because they have the same pitch (on account of the choosen design). At this, their outer diameter, where the geometrical surfaces actually intersect one another, the thin material sheets are cut off and joined to one another by any appropriate method. In a cross sectional view they will now form a slimm triangle with the outer diameter as its apex and the central cylinder wall as its base. This adds once more additional strength to the structure without interfering with the above described basic function. The hollow structure thus created can also be used to make it fully or partially buoyant in the water.

FURTHER ELABORATION ON THE INVENTION

BRIEF DESCRIPTION OF THE DRAWINGS

FIG. 1a and FIG. 1b show how several helicoids may be arranged side by side, yet with overlapping radii, so as to present a nearly fully closed surface-projection to the fluid flow. A synchronizing belt 11 keeps the rotation of the several helicoids in phase.

FIG. 6 shows the construction of a helicoid sheet from slotted circular discs.

FIGS. 7a, 7b, 8, 9 and 10 illustrate geometric relationships.

FIG. 16a is a side view; FIG. 16b is a view from the top but 15 degree off the vertical.

DETAILED DESCRIPTION OF THE PRINCIPLE OF THE INVENTION

To explain the principle on which the new fluid flow energy extractor works we must refer to some of the drawings, since this principle entails intricate geometrical relationships.

Figure 2A:
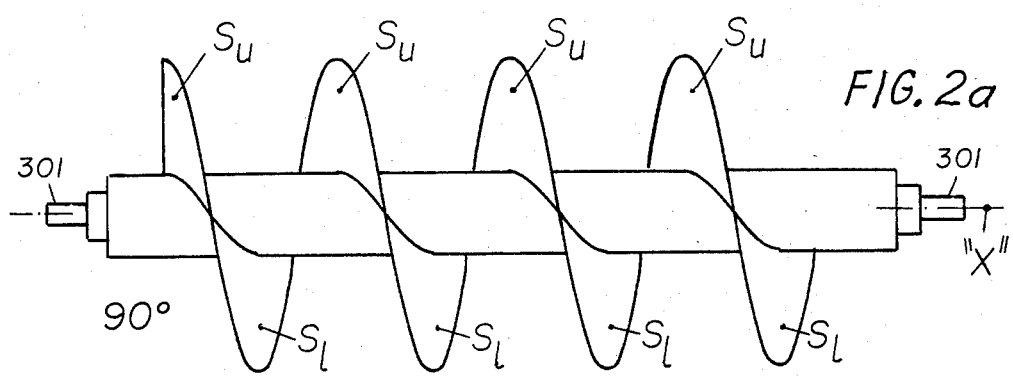
FIGS. 2a through 2d show various aspects of helicoid surfaces which are inclined toward the viewer, more or less. The axes of the helicoids make angles of 90°, 80°, 75°, and 55° with the line of sight, which is normal to the plane of the drawing.

FIG. 2a shows a helicoid sheet which winds itself around a cylinder of much smaller diameter than the outer diameter of the helicoid, and shows it in such a position that its axis, which is also the axis of the central cylinder, lies in the plane of the paper of the drawing. There is also a real axle shaft present, item 301, which can turn in bearings located at each end (not shown). In FIG. 2a we view the structure at 90° to its geometric axis "x". We see part of the upper surface $S_u$ and part of the lower surface $S_l$ of the helicoid sheet, which is made of some thin material such as sheet metal. The thickness of the sheet is not recognizable because of the scale of the drawing. In this view, at 90° to the axis "x" both surfaces present equal area to the viewer. If they were impacted by a fluid flow coming from the direction of our view point, namely perpendicular to the plane of the drawing, it would cause equal impact or drag on both surfaces, generating two moments with respect to the axis "x" which are equal and opposite, which therefore balance one another so that no rotational movement would be generated.

Figure 2B:
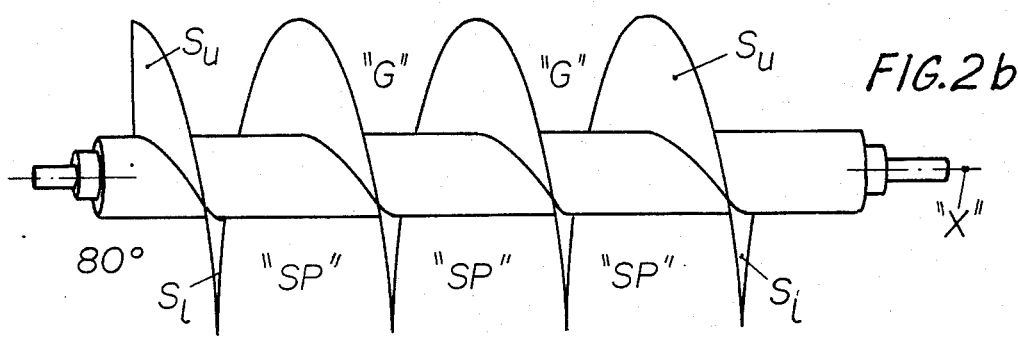

If we now lift the left side of the helicoid out of the plane of the paper, which means toward the viewer, as shown in FIG. 2b, then we see more of the upper surface $S_u$ and less of the lower surface $S_l$. In FIG. 2b the axis is tilted 10°, thus we view the structure at an angle of 80° with respect to the axis "x". If it is now impacted by a homogeneous fluid flow whose flow-vector is perpendicular to the plane of the paper, this flow will mainly impact the upper surface $S_u$, and only a very small area of the lower surface $S_l$. The moment generated by the impact forces are no longer equal and the structure begins to rotate. In doing so it extracts energy from the fluid flow, namely part of its kinetic energy, and the flow is diverted by the surface $S_u$.

The tilt angle in FIG. 2b is 10° whereas the maximum pitch angle of the helicoid (where it joins the central cylinder) is larger, namely 12° (as per design). Therefore a small part of the lower surface $S_l$ is still visible in 2b. Yet, below the axis "x" there is essentially free space "SP" through which the fluid passes unimpeded; no energy is extracted from this part of the flow, which is therefore lost for our purposes. This situation does not change either if a dual-thread or dual-sheet helicoid structure were used, as later described (FIG. 16). Yet in a dual-sheet helicoid structure the free areas marked "G" would be filled-in by the second helicoid sheet.

Figure 2C:
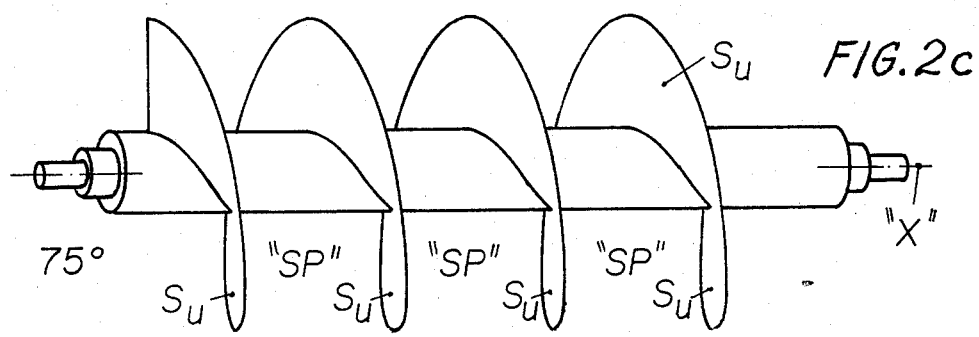

If the tilt angle of the axis "x" is increased to 15°, e.i. beyond the value of the maximum pitch angle, the view of FIG. 2c is presented to the eye and to the fluid flow. No part of the lower surface of the helicoid sheet is visible anymore; small sections of the upper surface $S_u$ become visible even below the axis. It should be noted that fluid flow impact on just one surface of the helicoid is only achieved for tilt angles equal to or greater than the maximum pitch angle. This distinguishes the present device with small pitch-angle and multiple turns of the helix from the earlier mentioned "tetrahelical" sail wind mill, whose pitch angle is very large, making it actually just a twisted Savonius rotor.

Even with a tilt-angle somewhat larger than the pitch angle the area "SP" of the free space is not greatly diminished and the part of the fluid flow passing through there is still not utilized.

Figure 2D:
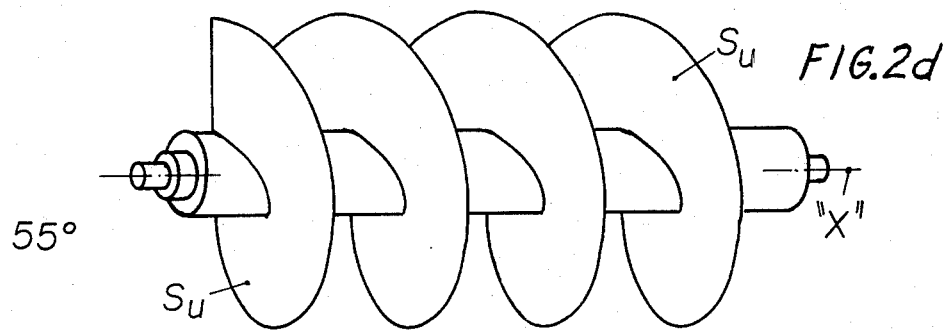

If the axis "x" is tilted still more, as in FIG. 2d where we look at the structure at 55°, we see larger projected areas of the upper surface $S_u$ than before. Above the axis, some parts of $S_u$ get obscured by other parts of this surface; below the axis the flow is impacting also on parts of the upper surface; yet the inclination of the surface area seen, in respect to the flow vector, has become so great that the moment generated from impact below the axis has the same direction as the moment generated from impact above the axis. (The terms above and below always refering to the views shown in the drawings of FIGS. 2a to 2d.)

Somewhere between the positions shown in FIGS. 2c and 2d is the one where the greatest momentum is generated, as experiments with models of these helicoids have shown. The exact value for the most favorable tilt-angle depends on the velocity and density of the flow medium, as well as on the rotational speed which the helicoid has already achieved and which is influenced by the load which the helicoid is made to drive. The best angle can always be found by trials. The angle may be kept adjustable to adapt it to flow speed changes and drive load conditions, and for starting and stopping the rotation.

Figure 3B:
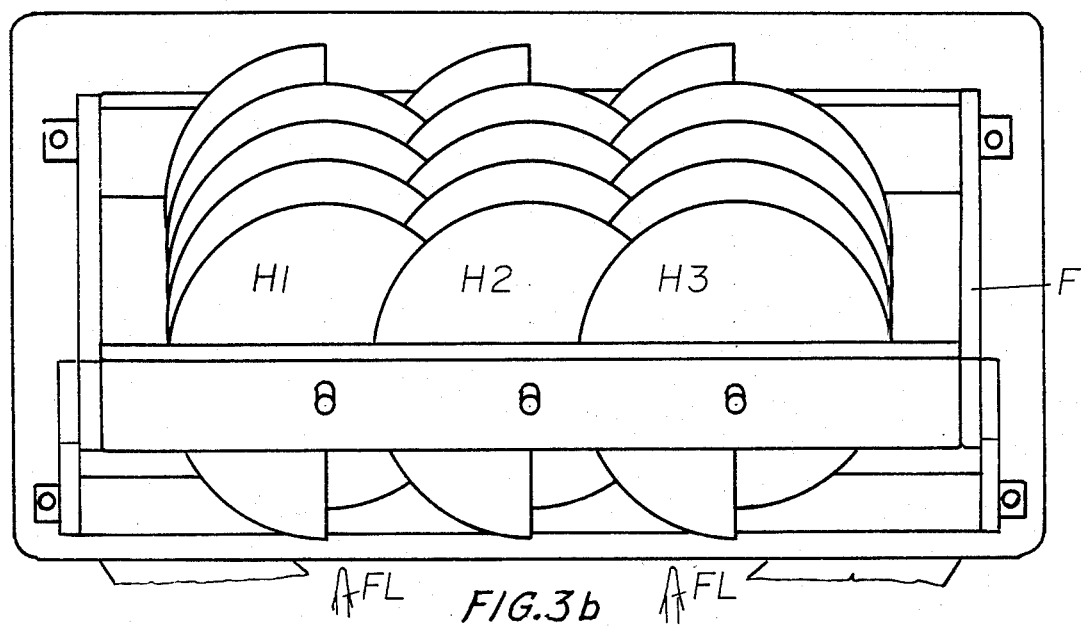
FIGS. 3a and 3b show another example of an array of helicoids in front elevation and plan view.

If the tilt-angle of the axis "x" against the flow vector "FL" would be increased still further, we would see the view presented in FIG. 3b. The first turn of the helicoid sheet then obscures nearly completely all the following ones and the total momentum generated by the fluid flow becomes much smaller. This is logically to be expected, but a model which I have built also demonstrated this effect. In other words, if the axis of the helicoid is pointed directly or nearly directly into the flow, only a single turn of it contributes to energy extraction; this is contrary to the teachings of the present invention which shows a multi-turn helicoid can be used to advantage, extracting more energy than a single-turn helical surface with its axis pointed directly into the wind.

Only the impact-forces, sometimes called drag-forces, have been mentioned so far. Yet there is another force acting on the helicoid surfaces. The helicoid can be compared to the sail of a sailboat. It is well known that one can sail at an angle of 20° to 25° against the wind, the sail itself making an angle of 10° to 15° with the wind vector (direction). Then, there is not only the impact-force acting on the side of the sail which faces the wind (at 10° to 15° as mentioned) but a low pressure suction force on the other side of the sail, generated by increased local wind speed on account of the presence of the sail. In propeller type of wind mills this is known as the "lift" force which turns the propeller. In the helicoid we have a combination of lift and drag device.

The part of the flow passing through the spaces "SP" in FIG. 2 is not utilized, as mentioned before. Yet fortunately, the geometry of the helicoid structure permits to add a second such structure in parallel to the first one, so that the radii overlap. This is shown in FIG. 1a and FIG. 1b. They show two helicoids, items 41 and 42, seen at 90° and at 55° to their axes. The rotation of the two helicoids must be synchronized and interlocked by a belt or chain drive in order to maintain the proper geometrical relationship, as schematically indicated by item 11 in FIGS. 1a and 1b. Of course, other synchronizing means can also be employed.

As mentioned, a flow striking the helicoids as they are shown in FIG. 1a, the flow vector being normal to the plane of the drawing, would not cause a rotation of the helicoids; yet if the helicoids are tilted foreward, as shown in FIG. 1b, the flow will induce a rotation of the structure. In case of FIG. 1b the fluid flow is also more fully intercepted, since there is little free space visible in the overlap areas of the helicoids. The helicoids never touch one another physically.

Figure 3A:
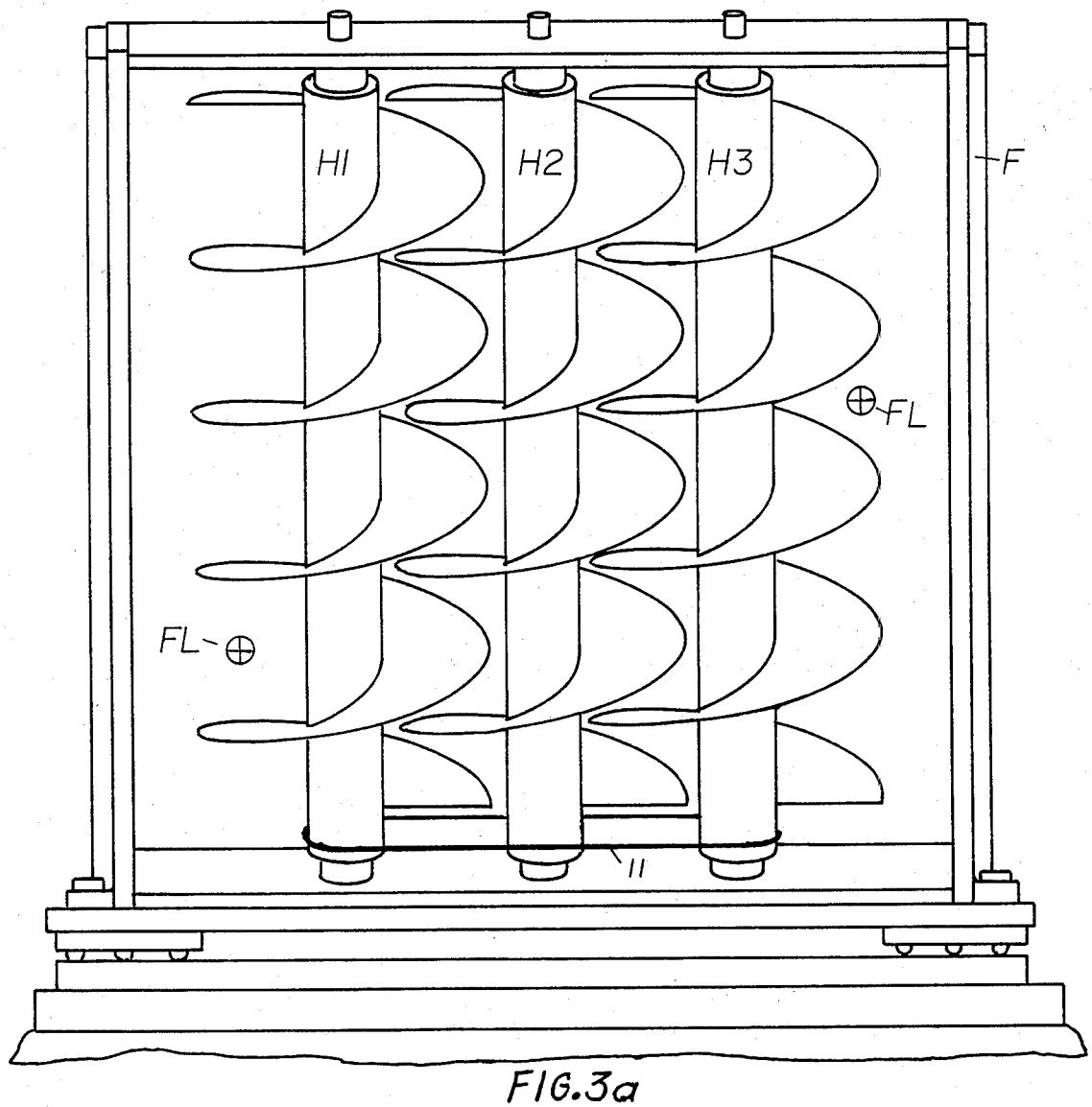

FIGS. 3a and 3b show front and plan view of three helicoids H1, H2 and H3 all mounted in one frame F. The fluid flow vector is indicated by the symbole FL. An arbitrary number of helicoids can be paralleled in this manner, presenting a nearly closed-area projection of arbitrary size to the fluid flow. A mile-long "wall of helicoids" can thus be assembled and presented to the wind or to an ocean current, especially where the flow direction is constant or where it just alternates between two directions opposite to one another. Any limits as to size are determined by practical structural design considerations rather than by limitations in principle.

Returning in our description for a moment to our earlier comparison with a sail boat, we can say that the two closely spaced sections in the overlap region of the two helicoid surfaces resemble the main sail and the jib of a sail boat. A certain distance must be maintained for maximum efficiency, as every sailor knows. Trials can readily establish the most favorable distance and pitch-angle for any multi-helicoid device, used as wind mill or water mill.

With respect to the use of the devices according to this invention as free-stream water mill it must be stressed that they extract part of the kinetic energy of the flow. The kinetic energy of a river-flow may have built-up over a distance of many miles of slow descent; at the point of installation of the helicoid structure into the water flow no great level difference must be present; it is not necessary to first generate a potential level difference by a dam or the like. In the case of a tidal flow it would not matter how high the tide rises, it need not be caught by dams etc., even a quasi-horizontal flow can be utilized and energy extracted. (Flow speed is, of course, somewhat linked to the height of the tide.)

Figure 4:
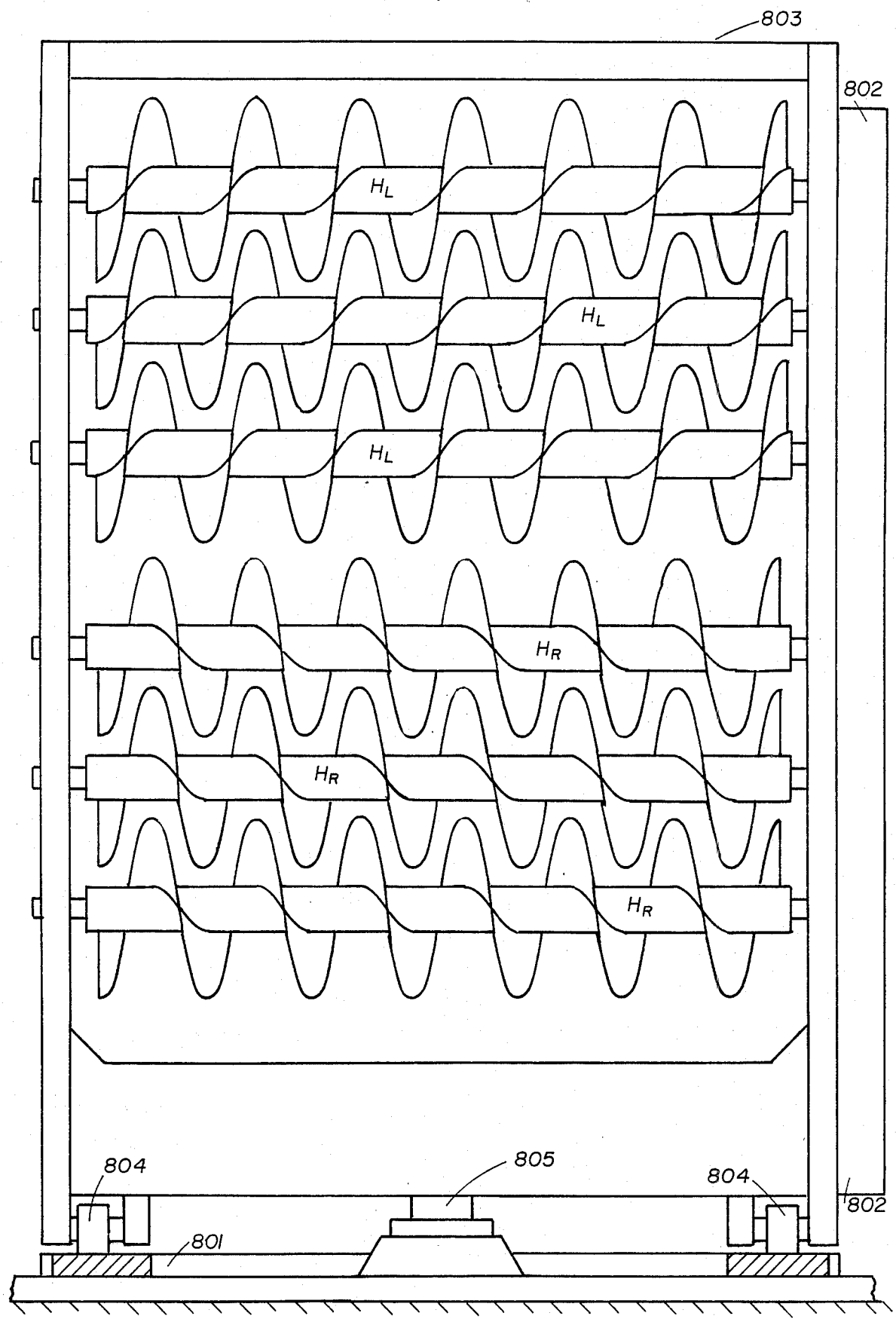
FIG. 4 shows an array of six (6) helicoids mounted with their axes parallel and horizontal. Three of the six are righthanded and three are lefthanded. They will therefore turn in opposite directions, and therefore no net gyroscopic force will be noticable when the whole structure is turned on its turntable 801, because the gyroscopic forces of each of the two sets of helicoids will be opposite and compensate one another. They will be taken up within the framework holding all the helicoids. On one side of the frame is mounted a gear box 802 to synchronize the individual helicoids and to extract the power which is generated.

In FIGS. 1 and 2 the geometrical principles have been explained. FIGS. 3, 4 and 5 show structural arrangements. Typical arrangements of overlapping helicoids H1, H2, H3, held in a frame F, are shown in FIGS. 3 and 4.

The structure of FIG. 3 or the other figures must not necessarily rest on natural ground; an ideal location for a wind mill is, for instance, the roof of a high-rise building in a city. Of course, a special tower may also be built for carrying the helicoids.

Figures 5A, 5B:
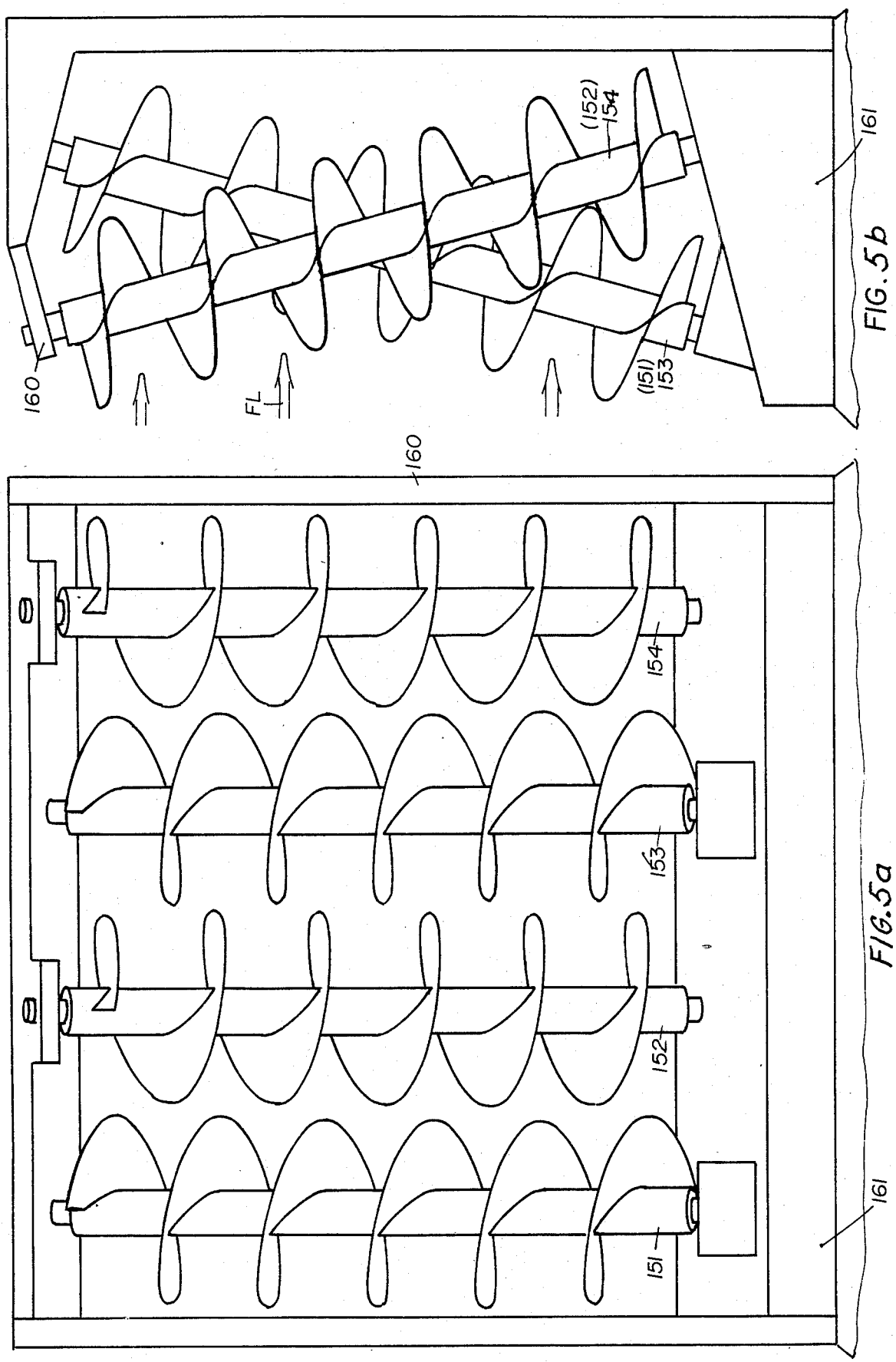
FIGS. 5a and 5b show 4 helicoids mounted in a common frame, two of them being inclined with their top against the flow, the other two with their top in the direction of the flow. Both pair have the same helicity, therefore two will turn clockwise, two will turn counter-clockwise. Again, the gyroscopic forces will be internally compensated when the whole frame is turned to keep facing into the flow when it changes direction.

Embodiments of the invention, designed to compensate internally for the gyro-forces which appear when the whole structure is turned while the helicoids are rotating, are shown in FIG. 4 and FIGS. 5a and 5b. In these arrays, half the number of the helicoids is made to rotate clockwise, the other half to rotate counter-clockwise, yet by different means.

FIG. 4 shows a set of six helicoids, three of them with right-handed helicity (marked $H_R$) and three with left-handed helicity (marked $H_L$). Each sub-set of three has overlapping radii. One sub-set will rotate clockwise, the other counter-clockwise. All rotations are synchronized and brought to a single output shaft by proper state of the art devices (not shown) located inside the box 802. Item 803 is the frame holding all helicoids; 804 are rollers attached to 803; 805 is a pivotal bearing. The whole frame can be turned on the platform 801 so that the helicoid axes make the proper angle with the flow vector.

In the array shown in FIGS. 5a and 5b the two different directions of rotation are obtained by an alternate tilt-angle of the axes, while all helicoids used have the same handedness of their helicity. Items 151, 152, 153, 154 are the helicoids; the frame holding them is schematically indicated by 160. Item 161 is the base with the gear box etc. FIG. 5a shows the areas of the helicoid sheets which the flow "sees"; FIG. 5b shows the difference in axial tilt.

STRUCTURAL DESIGN OF THE HELICOID ROTORS

It was so far quietly assumed the helicoids used are surfaces as per the above quoted dictionary definition, namely generated by a line moving up a helix with constant pitch. FIG. 6 shows how such an ideal helicoid would look if it were a sheet of finite thickness and made from a round disc of material which can be streched and then "re-frozen" in its final form, which is shown. (For instants, acrylics warmed to the softening point are such materials).

$E_1$ and $E_2$ are the edges of a radial cut made in the original flat disc.; $E_2$ is then lifted up by the distance $P^*$ and kept in a plane parallel to $E_1$. The lines $E_1$ and $E''$ in FIG. 6 are parallel, $E''$ and $E_2$ lie in the same plane; all of them pass through the axis "X". The radius of the original inner hole (before cutting the disc radially) is $R_1$. If then one end of this circle with radius $R_1$ is lifted so that the circle forms now a helical line, then it cannot form a full circle anymore. FIGS. 7a and 7b illustrate the relationships. A helical line of 360° would have to have the length $2\pi R_1/\cos \beta$, where $\beta$ is related to the pitch $P^*$ as shown in FIG. 7a. Since the edge of the inner hole has a length of only $2\pi R_1$ an angular gap is left between $E_1$ and $E_2$ (or its projection $E_2''$) that gap having an amount of $\delta$ (see FIG. 6). A certain difference in height, namely between $P^*$ and $P$ is also developing and shown in FIG. 6. The edges $E_1$ and $E_2$ are at right angles to the axis "X", as mentioned. An ideal helicoid is now obtained by attaching a similar second (and third, fourth, etc.) disc so that $E_1'$ (FIG. 6) is joined to $E_2$, and so forth. It does not matter that all joints are rotated by the small angle $\delta$.

Figure 8:
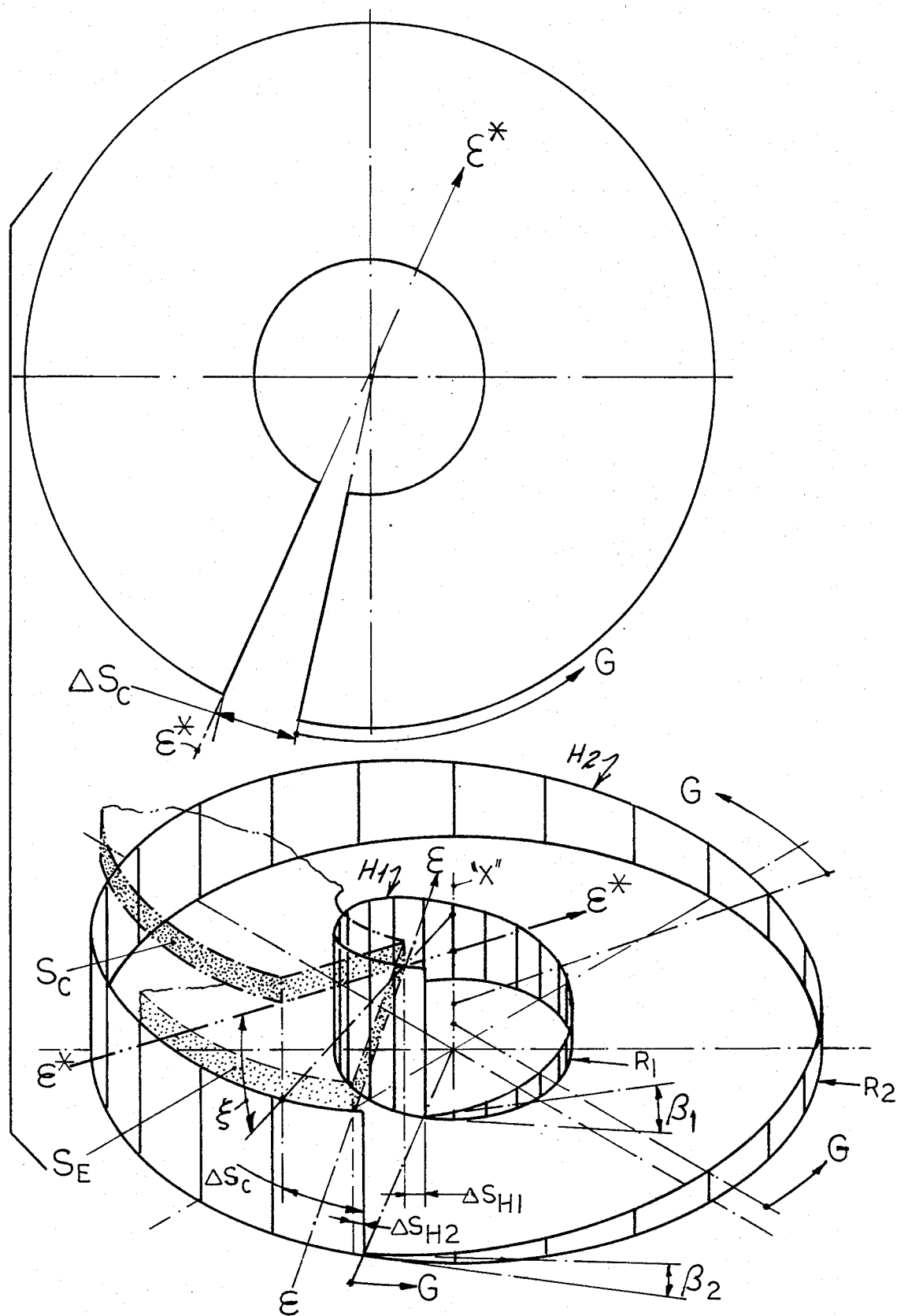

If a helicoid structure is to be formed from real sheet material of finite thickness, and not elastically stretched, conditions illustrated in FIG. 8 must be fulfilled.

FIG. 8 shows in an isometric drawing the generating line G of the ideal helicoid, always at right angles to the axis "X", moving up an inner helix $H_1$ with radius $R_1$ (projected into the base plane) and an outer helix $H_2$ with (projected) radius $R_2$. These helices can be thought of as rolled-up triangles, such as shown in FIG. 7a.

Figure 10:
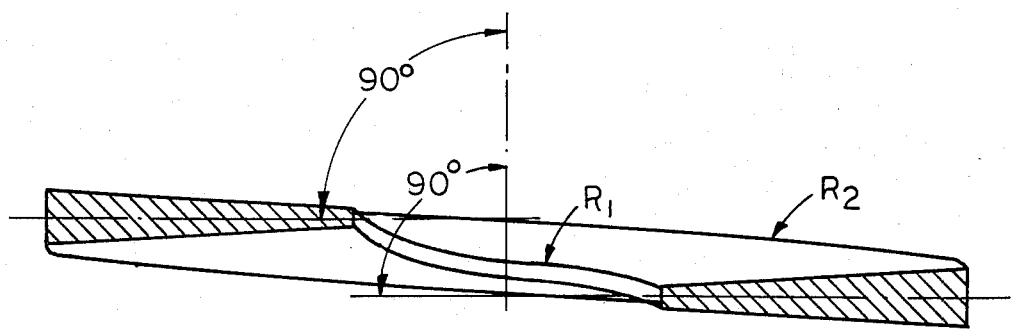

The helical lines $H_1$ and $H_2$ have the same pitch or "rise per revolution". The pitch angles $\beta_1$ and $\beta_2$ are then obviously different, namely a function of radius $R_1$ and $R_2$ etc., as FIG. 7a shows. If $R_1$ were the radius of the original hole in the material sheet $S_E$ while it lay flat, it would not extend the full 360° when raised to follow the helix $H_1$; a gap $\Delta S_{H1} = 2\pi R_1 (1/\cos \beta_1 - 1)$, would be left. Generally we find $\Delta S_H = 2\pi R(\sqrt{1+(P/2\pi R)^2}-1)$, which gets smaller the greater R becomes (for constant P). The same argument can be made for the outer edge of the disc $S_E$, for which a gap $\Delta S_{H2} = 2\pi R_2(1/\cos \beta_2 - 1)$ would be left. Since $\beta_2$ is much less than $\beta_1$ we find that $\Delta S_{H2}$ is less than $\Delta S_{H1}$. It follows that the line $\epsilon$ (in FIG. 8) which represents the edge of $S_E$ will no longer go through the axis "X". It will be necessary that we plastically (i.e. permanently) deform the originally flat disc $S_E$ to make its edge aim at the axis "X". It is necessary to stretch its inner, circular edge, and all other circular lines with radii between $R_1$ and $R_2$, leaving only the circle with radius $R_2$ at its original length. Plastic stretching of this kind can be accomplished by heat-softening a plastic sheet (as mentioned) or, in case of sheet metal, by hammering or by a rolling mill (with conical rollers in this case). We will then get a sheet with a cross section shown (exaggerated for clarity) in FIG. 10. This deformed sheet can no longer be pressed into a plane. This is the reason why a helicoid surface is called a warped surface, the warpage giving it great stiffness, which is to our advantage.

The deformation of a thin sheet is, however, not the only way to form a helicoid. FIG. 8 indicates also another solution.

Once the inner fibre of the disc (the circle having a radius $R_1$) has been raised onto the helix $H_1$, then all the fibers (circles) with radius greater than $R_1$ have excess length. This can be quite naturally taken up by overlapping the cut edges; yet in doing so, a cone is formed, whose cone angle depends on the degree of overlap. In first approximation we have the following relationships.

In forming a cone from a flat, ring-shaped disc with a radial cut, overlapping the cut edges, any circular fiber with radius $\rho$ retains this distance from the axis but it is now measured in the direction of the cone's surface, no longer perpendicular to the axis "X". The radius of the projected circle $R_P$ (projected into the original plane of the disc) oriented perpendicular to the axis "X" is now smaller than $\rho$. The length of this circle is derived in FIG. 7b; it is $R_P = \rho \cos \xi$, where the angle $\xi$ is the cone angle. $\xi$ is related to the rise $C(\xi)$ of the cone surface over the original plane as follows: $\tan \xi = C(\rho)/R_P$. The excess length $\Delta S_C$ of the circle of the fiber with length $S_f = 2\pi\rho$ over the length of the projected circle $S_P = 2\pi R_P$ is therefore $\Delta S_C = S_f - S_P = \pi\rho(1 - \cos \xi)$. Yet, since $\rho = R_P/\cos \xi$ we can also write $\Delta S_C = (2\pi R_P/\cos \xi)(1 - \cos \xi) = 2\pi R_P[(1/\cos \xi) - 1)]$. Since $1/\cos \xi = \sqrt{1+\tan^2\xi}$ we get also: $\Delta S_C = 2\pi R_P(\sqrt{1+[C(\rho)/R_P]^2}-1)$.

We see from the above, that any amount of excess length of a fiber of radius $\rho$ from the axis can be taken up by simply making $\Delta S_C$ larger by making the cone angle larger. This permits us, in first approximation, to compensate for the difference $\Delta S_H$ of the helical line with projected radius R; we simply need to equate R with $R_P$ and $C(\rho)$ with P. Because the angle $\xi$ is a constant and $C(\rho)$ increases with radius, whereas the pitch-angle $\beta$ varies with radius and P is constant, the approximation works only for moderately large diameters of the helicoid sheets and moderate values of the maximum pitch-angle $\beta_1$. However, within these limits it is readily possible to form a funnel-shaped helicoid surface from a flat, rigid disc of thin sheet material. FIG. 8 illustrates how then existing radii $\epsilon^*$ of the disc remain aimed at the axis "X" while the inner edge follows the helix $H_1$ and the outer edge is raised so that the sheet $S_C$ (FIG. 8) lies at an angle to the sheet $S_E$.

In passing it should be mentioned that for one turn of the helix the angle $\xi$ may be positive, for the next turn it may be negative; at the transition point the sheet would be parallel to the generating line G; one would not normally use such a wavy helicoid and none is shown here.

In conclusion of these explanatory discussions we can simply state that a slightly cone-shaped helicoid structure can be built from a flat, ring-shaped disc, without the need for plastic deformations. Yet designs with plastic deformation of the sheets shall not be ruled out for the purpose of this invention.

Figure 9:
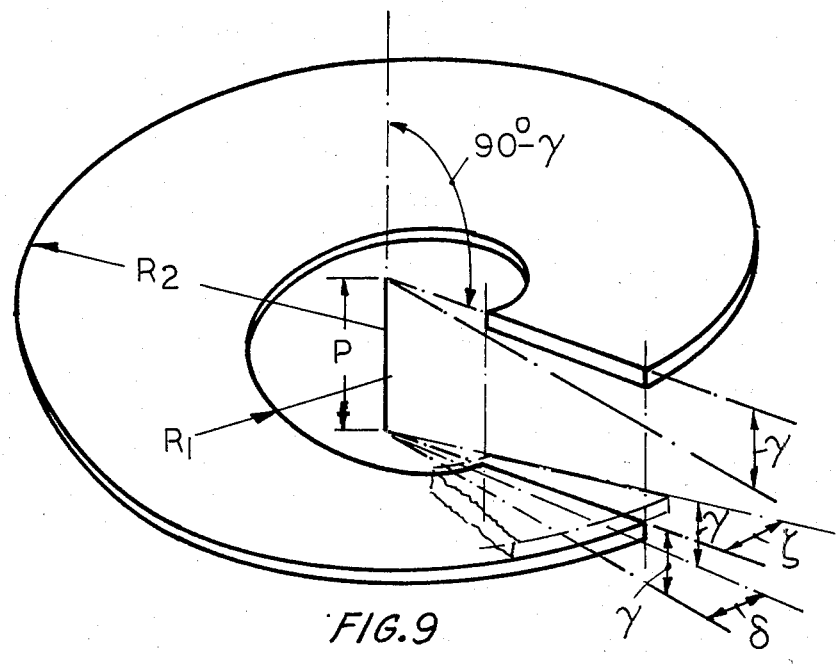
Figure 13:
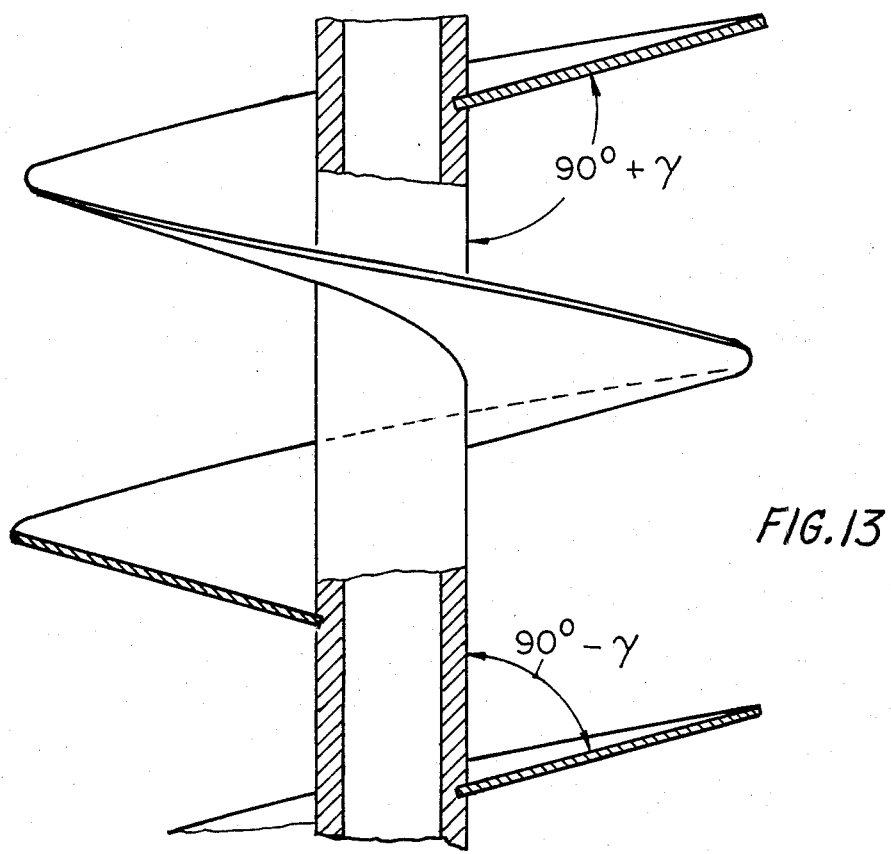
FIG. 13 is a view and partial cross section through a funnel-shaped helicoid structure.

Once conical-shaped helicoid-structures are considered, it follows that cone-angles in excess of the ones for compensating the helical length differences in the circular fibers of the materials, can readily be obtained when the overlap is already started along the helix $H_1$ of FIG. 8. This is shown in FIG. 9 where $\gamma$ is the cone-angle, P is the pitch distance, $\delta$ is the angular gap to be expected without compensation, and the angle $\xi$ is excess overlap deliberately introduced to increase the cone-angle. From such discs a cone-shaped helicoid is formed as shown in FIG. 13, partly in side view, partly in cross section.

The disc structure of all the helicoids shown is held to its pitch and to its axis by a central cylinder of radius $R_1$ (as shown in all drawings) to which the discs are fixed by any suitable method, such as gluing, soldering, brazing, welding, or by mechanical fasteners such as screws, clinch lugs, pins, etc. Similarly, any such method may be used to join the edges of the individual discs forming the helicoid sheet.

Figure 11:
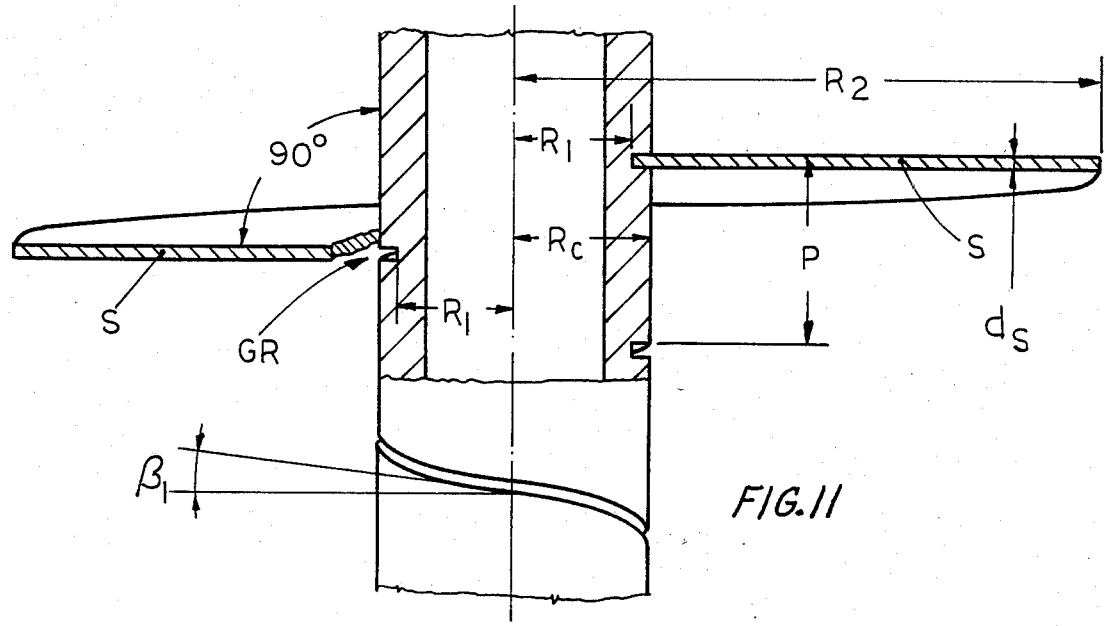
FIG. 11 shows one method of attaching the helicoid sheet to the central cylinder.

The proper pitch can be secured by having a groove GR cut into the wall of the cylinder, as shown in FIG. 11. The groove, which is wide enough to hold the thin sheet S of thickness $D_s$ forming the helicoid, has a root radius $R_1$, whereas the cylinder has the larger radius $R_c$. Once more shown in FIG. 11 are the pitch height P and the pitch angle $\delta_1$ at the radius $R_1$.

Figure 12:
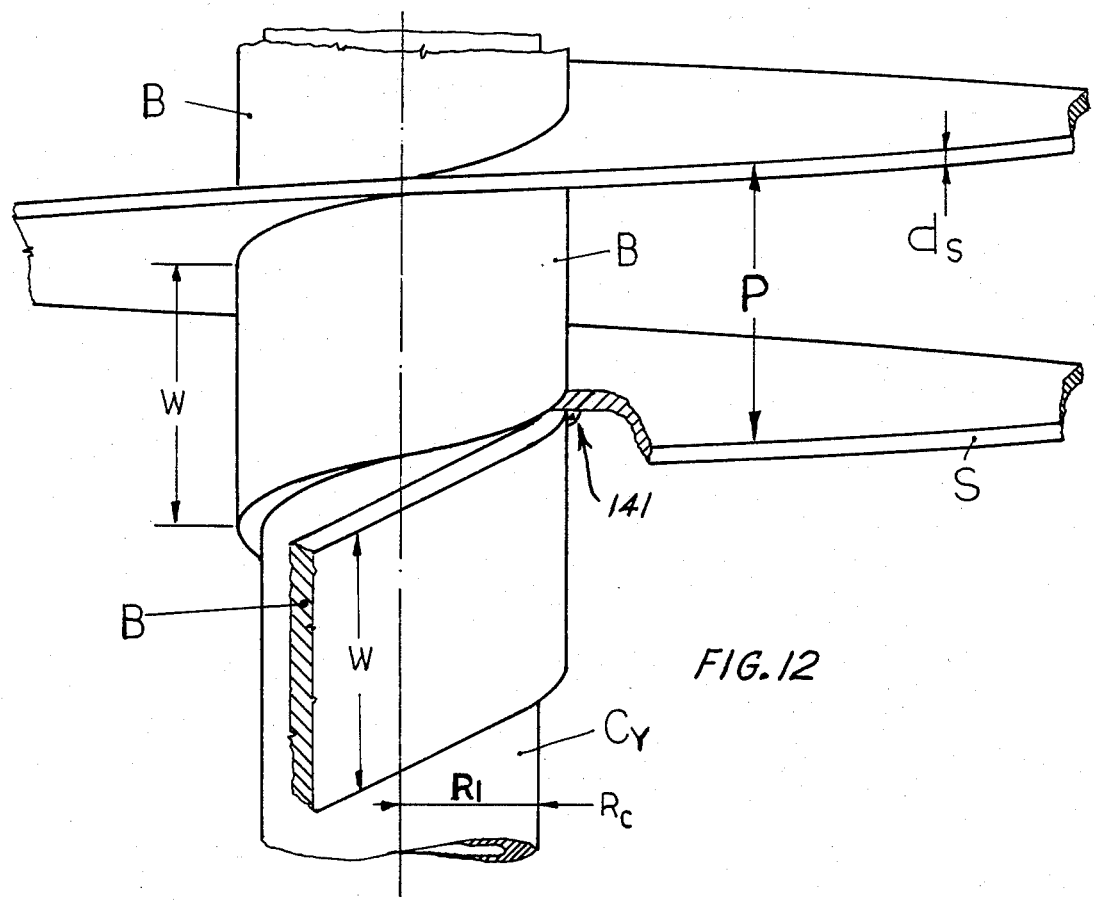
FIG. 12 shows another method of attaching the helicoid sheet to the central cylinder.

An alternate methode to secure the pitch height P and to support the helicoid sheet S to the central cylinder $C_y$ is shown in FIG. 12. There the cylinder has the radius $R_1$ and a strip B of of material of width $w = (P - d_s)$ is wound around it, leaving a gap of width $d_s$, where $d_s$ is the thickness of the helicoid sheet. After assembly, a weld 141 may be made in the corner formed by B and S. Other methods of attachment, as mentioned above, may also be used for joining $C_y$, B, and S permanently.

Figure 14:
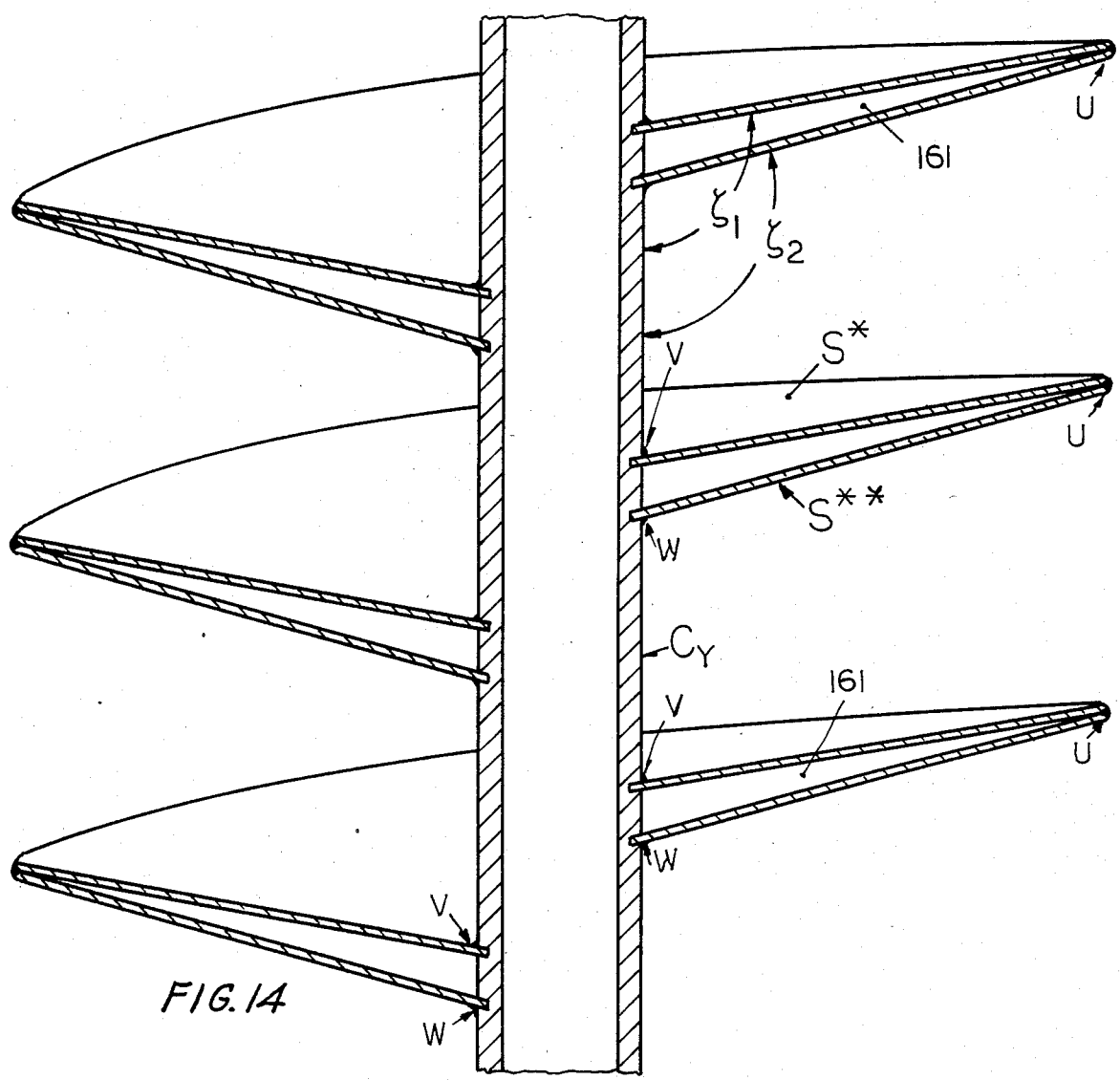
FIG. 14 is a section through a double-sheet structure with a triangular space enclosed by the two helicoid sheets.

It is furthermore possible, and shown in FIG. 14, to combine a regular helicoid sheet S with a funnel-shaped helicoid sheet S*, or even one S* with a cone angle $\zeta_1$ and one S** with a cone angle $\zeta_2$. The sheets S* and S** are bonded at the perifery U by any suitable method. Since these sheet are also ridgidly fixed to the cylinder $C_y$ at the joints w and v, a ridgid triangular cross section 161 is formed. It will be appreciated that the joint at w, v, and U, each form a continuous helical line from and end of the helicoid structure to the other, and so does the triangular space 161. At the beginning and the end of the helicoid the space 161 is preferably closed by a triangular cover (not shown). The triangular shape represents a very strong yet simple light weight structure. The inner volume will also provide some buoyancy if the structure is employed as free-stream water mill. If additional buoyancy is required, the central cylinder $C_y$ can be made larger, so that the increase in sealed volume will make the whole structure buoyant or partly buoyant, as desired.

State-of-the-art technology is used for the bearings etc. in which the helicoids are held, also for the electrical generators or other devices driven by the helicoids, such as compressors, pumps, or friction devices to generate heat, as the case may be. They do not need detailed descriptions.

FURTHER VARIATIONS OF THE INVENTION

It is possible, and it has certain advantages, to replace the circular/cylindrical structure which has been discussed and described so far, by structures with polyhedrical cross sections, such as hexagons, dodecahedrons or others.

Figure 15:
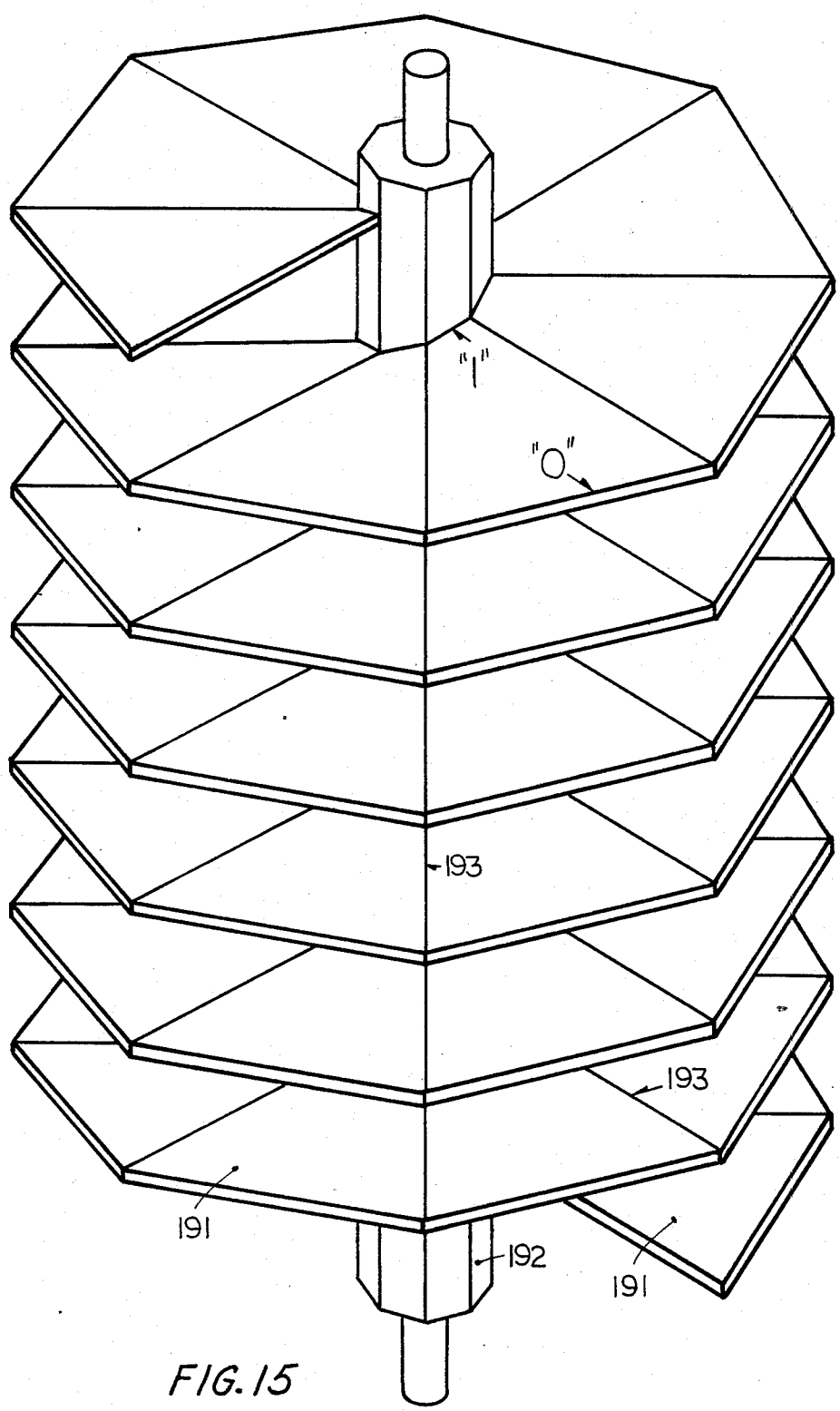
FIG. 15 shows a non-circular, but octagonal helicoid structure, built from flat sections of a sheet material.

The central cylinder to which the helicoid sheet is attached can, for instance, be an octagon. The thin helicoid sheet may also be cut with an octagonal hole, while the outer perifery may stay circular or be also cut with eight straight sides. It is much simpler, however, to form the helicoid sheet surface from sections of flat stock. This is the chief advantage of the new shape. FIG. 15 shows an example.

The helicoid surface is now no longer a smooth one but it rises in eight steps per turn; this will not interfere with the heretofore described operation and function. It is more economical to compose the helicoid sheet of flat, small sections of sheet material, e.g. sheet metal, which are trapezoidal in shape, items 191 in FIG. 15, with two parallel sides. The two other sides include an angle of slightly more than 45°. The excess of the angle above 45° depends, of course, on the choosen pitch-angle of the structure. There are no left over-pieces of sheet material as is the case if circular sections are cut from larger pieces. While the helicoid sections are attached to the octagonal cylinder 192 they are also joined to one another along their radial edges 193, forming ultimately a continuous surface.

The inner edge "I" and the outer edge "O" of each one of the individual sections are, after assembly, no longer lying in the same plane. The reason is the variation in pitch angle, just as in the case of the circular structures. The original flat sections get warped. But for our generally small pitch angles it is not difficult to twist the sheet sections into their proper shape. The aforementioned advantages of using flat, parallel-sided sheet stock from which to make the sections remains the same.

Figure 16B:
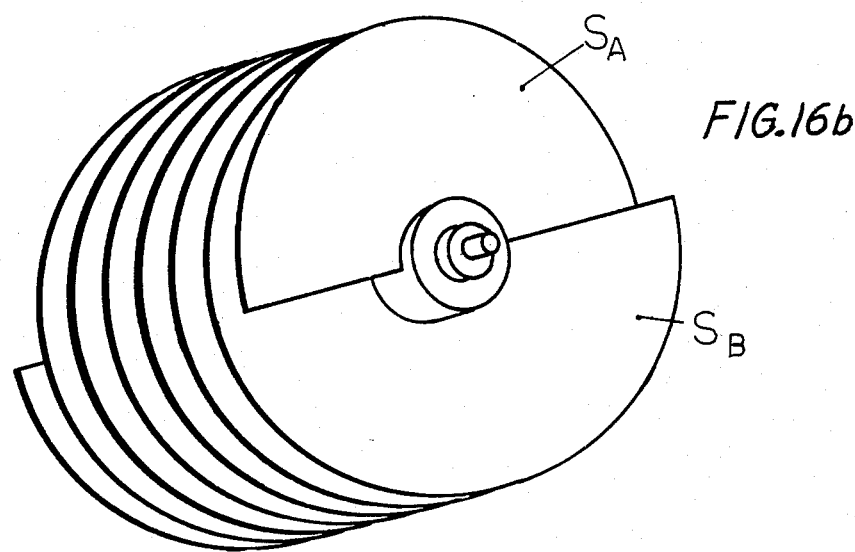
FIGS. 16a and 16b show details of a "dual-thread" helicoid structure, consisting of two sheets winding around a common central body, and being spaced apart by half of their pitch distance.
Figure 16A:
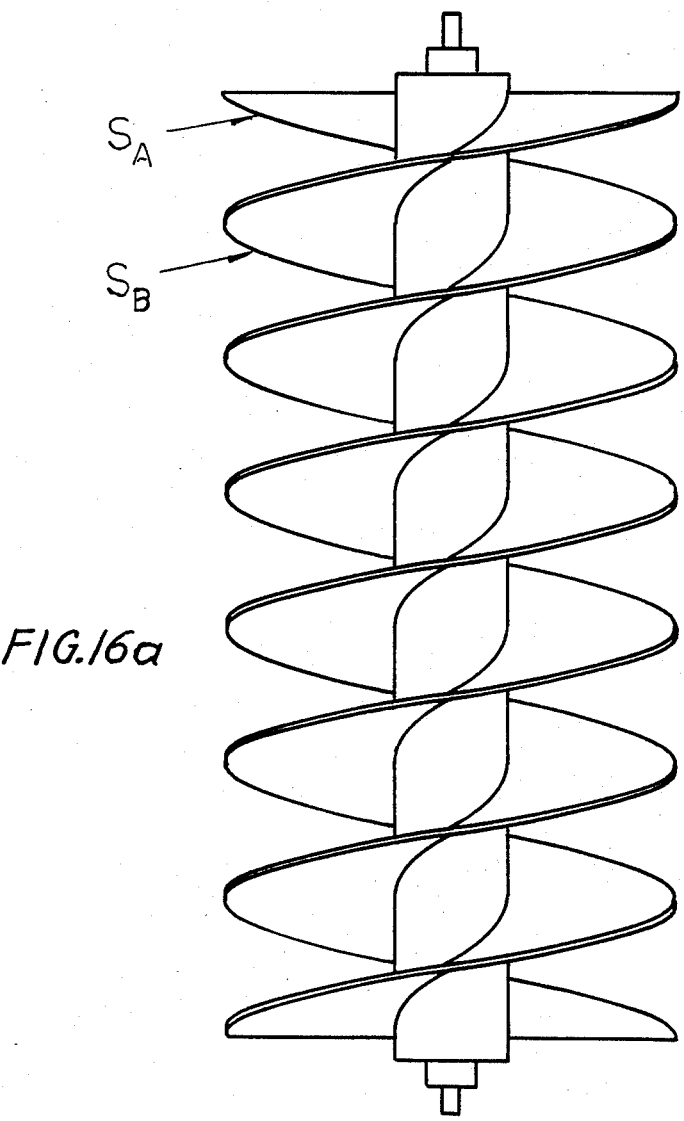

A further variation of the basic structure of the fluid-flow energy extractor using helicoids is possible, either with the circular or the polygonal type. This variation is shown in FIGS. 16a and 16b. Shown there are two interspaced helicoid sheets $S_A$ and $S_B$ having the same pitch and being spaced half the pitch distance apart. It is, in principle, possible to use 3 or 4 such helicoid sheets spaced $\frac{1}{3}$ or $\frac{1}{4}$ the pitch distance apart, respectively. The structure of FIG. 16 is reminiscent of a dual-threaded screw. The advantage of the multi-surface design lies in the fact that now, for a given pitch distance, more surface area is presented to the flow.

As a further variation, any of the above described helicoid structures may be combined with a flow-diverter, which is fixed, and which directs the flow vector so that it makes the appropriate angle with the helicoid axis. Just one example is shown in FIG. 17.

Figure 17:
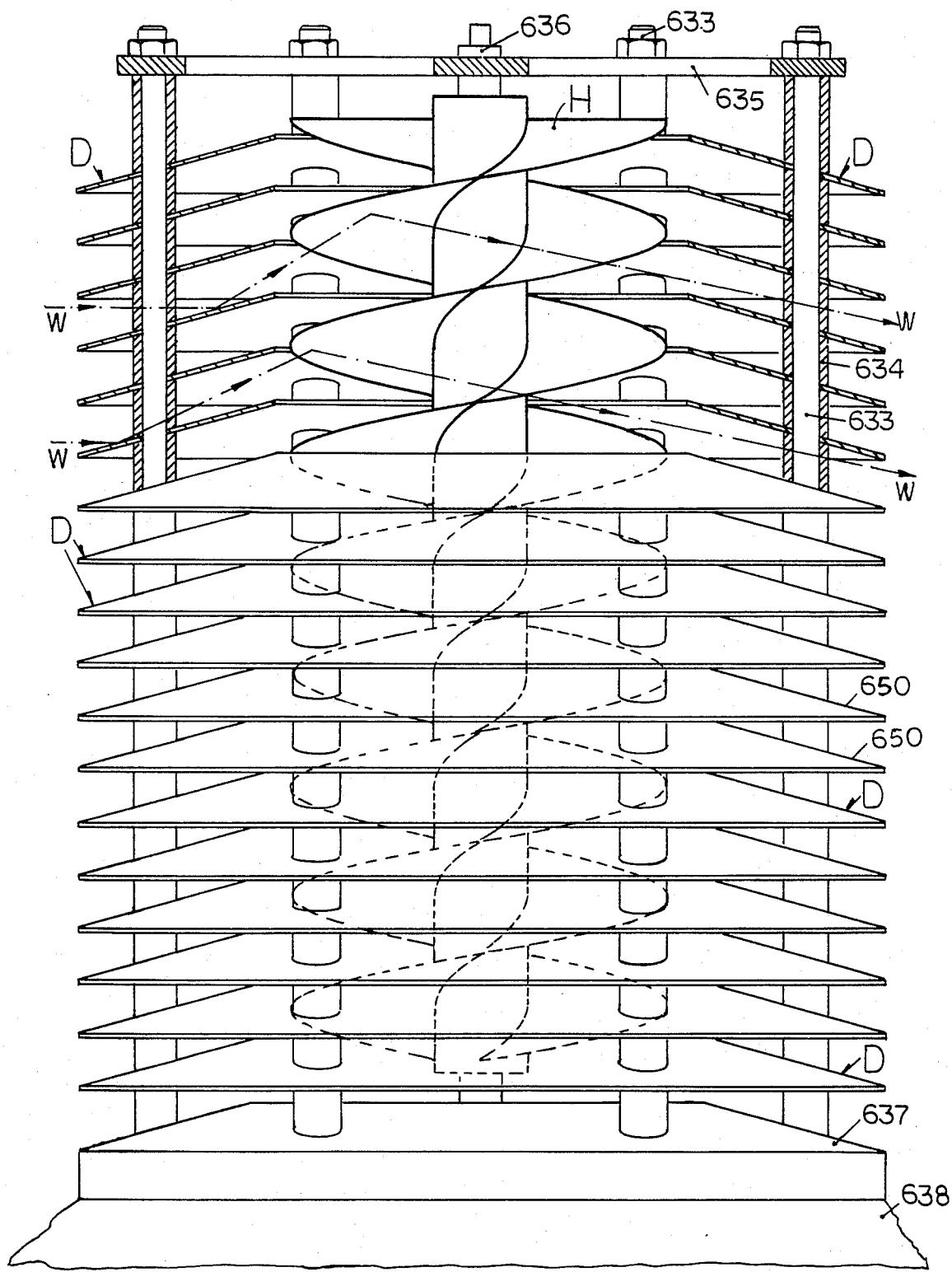
FIG. 17 shows a helicoid structure "H" with its axis held vertical, surrounded by a stationary, cylindrical flow diverter "D" which is effective regardless of the direction of the flow. The helicoid is, in this case, of the dual-thread type.

Shown in FIG. 17 is a helicoid with its axis in a vertical position and surrounded by a stationary flow-deflector. Item H is the helicoid, item D is the flow-deflector. The helicoid being of the circular type the flow deflector is also circular; but polyhedral structures, as previously described, may be substituted for both items. This arrangement will be particularly advantageous as an omni-directional wind mill.

The ring-shaped, inclined flow-deflector surfaces 650 deflect the wind, from whatever direction it is blowing, upward by an amount equal to or slightly larger that the pitch-angle of the helicoid. The lines W in FIG. 17 represent some typical wind flow lines. In passing through the helicoid the wind will set it in rotation and will be deflected again, this time in a downward direction so that it will easily exit at the other side, the leeward side of the flow deflector. Note, that in this case the flow is not directed vertically upward, and it does not exit at the top of the structure, as in some of the existing wind turbine designes. There is no complete "wind shadow" behind the structure, which may cause problems because of the great under-pressure which it would cause in the case of large structures. In the present case the leeward wind flow is not materially influenced by the size of our structure. It can therefore be built very large. In addition, the helicoid design has the advantage over every turbine/propeller type of design that the helicoid presents a larger area to the wind, for any given size of the structure; this permits to utilize more of the wind energy.

The flow deflector of FIG. 17 is held and spaced by the rods 633 and spacers 634. They also hold the upper plate 635 with the upper bearing 636 of the helicoid H. The base of the structure, item 637, carries the lower bearing (not visible) and, in its interior, power generating means etc. which are not shown in detail. Item 638 indicates the natural ground on which the whole structure rests. It can also rest on top of a high-rise building, as mentioned earlier.

I claim:

1. Apparatus for extracting energy from the kinetic energy of an unbounded fluid flow such as wind or water, making use of an array of helicoids, characterized by
   (a) the helicoids having all the same pitch angle of between 5° and 36° and having their axes arranged in one plane and parallel to one another,
   (b) the spacing of the axes being so chosen that the outer diameters of adjacent helicoid structures overlap, so that the helicoid sheet of the second helicoid structure gets positioned in the open spaces between the sheet of the first helicoid structure, the sheet of the third gets positioned in the open spaces between the sheet of the second, and so forth, so as to present a long, nearly dense looking array to the fluid flow,
   (c) means for coupling and synchronizing the rotation of all said helicoil structures, so as to secure the mutual position of said helicoid sheets in their respective spatial relationship as just described, and means to couple their rotation to a common output shaft to which they then deliver their energy, said output shaft being coupled to a device doing useful work,
   (d) means securing an appropriate angular relationship between the fluid flow vector and the axis of the helicoids, namely so that the flow vector and a radius vector at right angles to the axes of the helicoids form an angle between them of the same order as the pitch angle of the helicoid, so that essentially only one side of the helicoid sheets is impacted by the fluid flow, at an angle to the normal of the sheet surface, thus deflecting the flow without stopping it completely, the helicoid thereby being set in rotation by the recoil forces, as well as on account of the fluid dynamic negative pressure forces generated on the opposite sides of the helicoid sheets by that part of the flow which passes through the structure.

2. Apparatus according to claim 1 characterized by
   (a) having the axes of the helicoids in a vertical position,
   (b) being located on top of a natural hill site whose slope directs the flow in an upward direction, so that the said angular relationship between the helicoid axes and the flow vector is secured on account of the chosen location.

3. Apparatus according to claim 1 characterized by
   (a) having the axes of the helicoids in a vertical position,
   (b) having a flow defector placed in front of the helicoid array for deflecting the flow upwards by an angular amount of the order of the pitch angle of the helicoids, thus securing said angular relationship between the flow vector and the axes of the helicoids.

4. Apparatus according to claim 1 characterized by
   (a) the helicoids being mounted in a frame which can be adjusted to secure the said angular relationship between the axes of the helicoids and the prevailing flow vector,
   (b) means for automatically adjusting said frame with respect to the flow vector when the direction of the flow vector changes.

5. Apparatus according to claim 1 consisting specifically of
   (a) two sets of equal numbers of helicoids, the first set having right-handed helicity, the second set having left-handed helicity, with none of the helicoids of the first set overlapping any of the helicoids of the second set with their outer diameters, yet the helicoids of each set overlappng one another as described,
   (b) a support frame holding both sets, that frame taking up the opposite directed gyroscopic forces which are generated when the rotating sets of helicoids are turned into the flow or turned with the flow when its direction changes, so that no net forces of gyroscopic origin will appear, which would tend to tilt and eventually topple the support frame.

6. Apparatus according to claim 1 for extracting energy from the kinetic energy of an unbounded fluid flow, such as wind or free flowing water, consisting of a multiplicity of helicoids, characterized by
   (a) having an even total number of helicoids, all of them having the same helicity,
   (b) a common support frame holding all said helicoids by means of bearings at each end of each helicoid structure,
   (c) the bearingsbeing so positioned that the axes of half the helicoids are tilted against the flow vector by a certain angle in the order of the pitch angle of the helicoids, whereas the axes of the other half of the helicoids are tilted with the flow vector by an angle of equal absolute magnitude, thus causing one half of the helicoids to rotate in one sense of revolution and the other half of the helicoids to rotate in the opposite sense of revolution, so that gyroscopic forces generated by the two sets of helicoids are equal and opposite in value when said common support frame is turned, said forces thus being taken up in said support frame and cancelling one another and no net force will act on the frame as a whole when it is turned into the flow direction.

7. Helicoid structure for use in the apparatus according to claim 1, characterized by
   (a) having a round, cylindrical central body whose length L is greater than its diameter D and carrying the helicoid sheets which make up each individual helicoid structure
   (b) said helicoid sheets being made of smooth, thin, stiff sheet material, winding themselves around said cylindrical central body in a screw-like fashion, making at least two turns around the central body, at a constant pitch with a pitch distance P of less than the diameter D of the central body, and having a maximum pitch angle of between 5 and 35 degrees, said helicoid sheets having an essentially circular outer perimeter and a width greatar than D, therefore an outer diameter greater than 3D, and being oriented so that any radial line drawn on their surface is essentially perpendicular to the axis of the central body,
   (c) said helicoid sheets being rigidly attached to the central body,
   (d) an axle and bearings on at least one end of the central body, permitting a free rotation of the central body with its attached helicoid sheets while the axle is held so that it makes an angle with the flow vector, of a magnitude in the order of the pitch angle of the helicoids.

8. Helicoid structure for use in the apparatus of claim 1, characterized by
   (a) having a polyhedral central body, and
   (b) having helicoid sheets consisting of a multitude of flat segments, one to each side of said polyhedral central body for each full turn of the helicoid surface,
   (c) said flat segments being rigidly joined to said polyhedral body and to one another at each of their radial edges, so as to form a continuous surface, not withstanding the small kinks at the radial edges of adjoining segments, and thereby approximating an unbroken smooth helicoid sheet performing all the functions of the helicoid sheets of the apparatus of claim 22,
   (d) said helicoid sheets having a polygonal outer perimeter.

9. Helicoid structure for use in the apparatus of claim 1, characterized by the radially extending helicoid sheets forming a funnel-shaped structure where any radial line drawn on the helicoid surface is making an angle of less than 90 degree with the axis of the central body.

10. Helicoid structure for use in the apparatus of claim 1 characterized by
    (a) having two smooth, helicoid sheets making different angles with the axis of the central body, at least one of the two helicoid sheets being funnel-shaped,
    (b) both helicoid sheets being firmly attached to the central body at a small distance from one another less than half the pitch distance,
    (c) both helicoid sheets having the same pitch angle,
    (a) both helicoid sheets being firmly attached to one another on their outer perimeter where their geometrical surfaces intersect, so as to form a stiff, rigid, hollow structure of triangular cross section.

11. Apparatus for extracting energy from the kinetic energy of an unbounded fluid flow, such as wind or water, regardless of the direction from which this flow arrives, characterized by
    (a) a single helicoid structure of any one of the types described in claims 3, 4, 5 or 6,
    (b) said single helicoid having its axis of rotation fixed in the vertical position,
    (c) a rigidly mounted flow-deflector structure completely surrounding the helicoid structure, yet without touching it, and consisting of a stack of thin sheet material surfaces, each layer of said stack spaced from the next layer by a distance in the order of half the pitch distance of the helicoid, the spacing of said layers being secured by a plurality of slim vertical spacers,
    (d) the surfaces of said flow-deflector structure being inclined with respect to the horizontal plane by an angular amount of the same order of magnitude as the pitch angle of the helicoid, thus forming an upward pointing cone,
    (e) the flow being deflected upward by this flow-deflector structure—regardless of the direction from which the flow arrives, and without moving or turning the flow-deflector structure—so that the flow vector of the deflected flow makes an angle with the axis of the enclosed helicoid in the order of the pitch angle of the helicoid, thus causing the helicoid to rotate and extract energy from the flow,
    (f) the flow leaving the helicoid structure, after rebounding from it, essentially at the opposite side from where it entered and in a slightly downward direction, the pitch angle of the helicoid and the angle of the flow deflector surfaces being judiciously chosen to achieve minimum obstruction of the outgoing flow by the flow-deflector.

* * * * *